Figure 1:
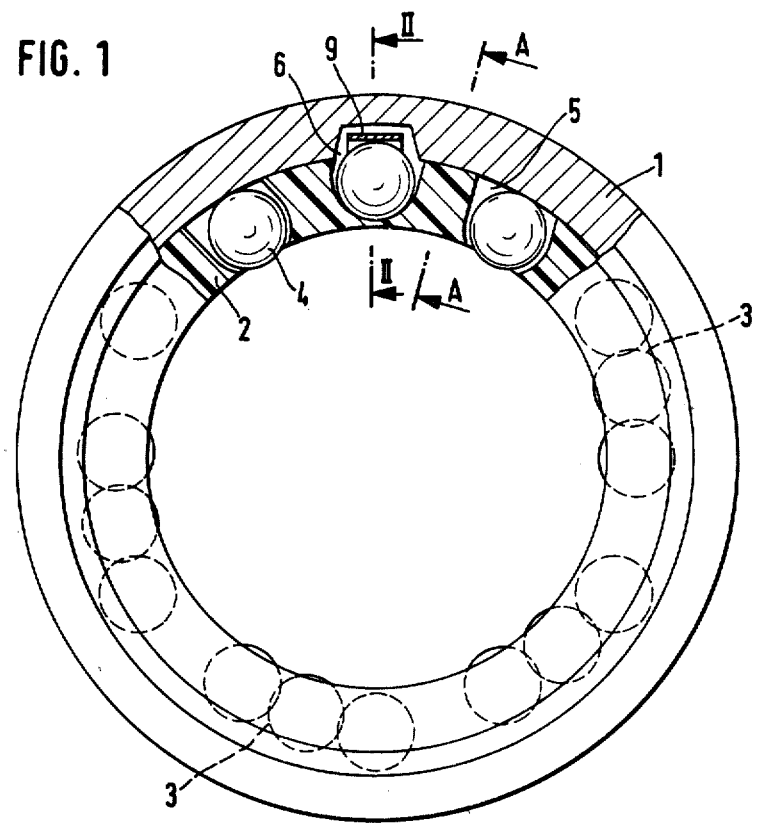

United States Patent [19]
Koschmieder

[11] 4,372,623
[45] Feb. 8, 1983

[54] RECIRCULATING BALL BEARING

[75] Inventor: Hartumut Koschmieder, Erlangen, Fed. Rep. of Germany

[73] Assignee: Industriewerk Schaeffler OHG, Herzogenaurach, Fed. Rep. of Germany

[21] Appl. No.: 354,902

[22] Filed: Mar. 4, 1982

Related U.S. Application Data

[63] Continuation of Ser. No. 68,639, Aug. 22, 1979, abandoned.

[30] Foreign Application Priority Data

Aug. 30, 1978 [DE] Fed. Rep. of Germany ....... 2837740

[51] Int. Cl.³ .............................................. F16C 29/06
[52] U.S. Cl. .................................. 308/6 C; 308/6 R
[58] Field of Search ............ 308/6 C, 6 R, 6 A, 4 A, 308/3 A

[56] References Cited

U.S. PATENT DOCUMENTS 3,933,396  1/1976  Nilsson ........................... 308/6 C
4,005,913  2/1977  Thomson ........................ 308/6 C Primary Examiner—Lenard A. Footland
Attorney, Agent, or Firm—Hammond & Littell, Weissenberger and Muserlian

[57] ABSTRACT

A recirculating ball bearing for longitudinally moveable mounting of shafts comprising an outer race sleeve and a concentrically disposed guide sleeve with a plurality of ball races distributed over its circumference, each of the said ball races consisting of two straight race sections extending essentially parallel to the bearing axis and two semi-circular race sections connecting the two straight race sections and a plurality of balls guided in the races under load in only one straight race section and under no load in the remainder of the race section, the improvement comprising providing at least one elastically yielding area in the said remainder of the race section.

13 Claims, 11 Drawing Figures

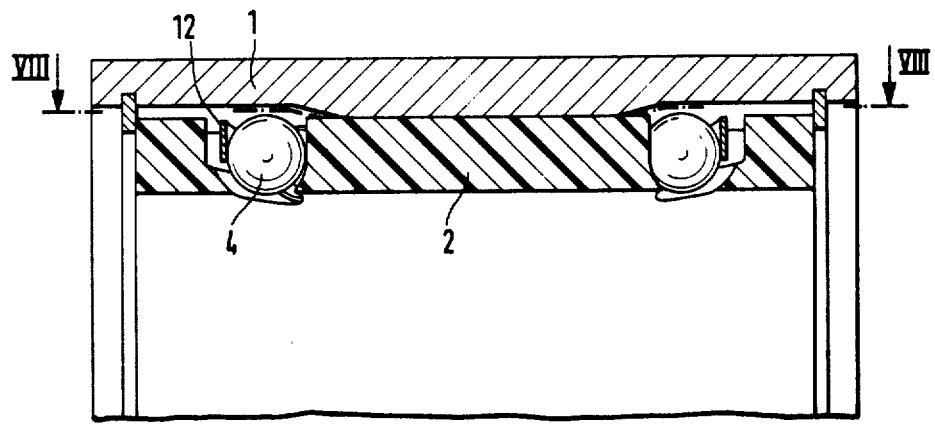
FIG. 7
FIG. 8
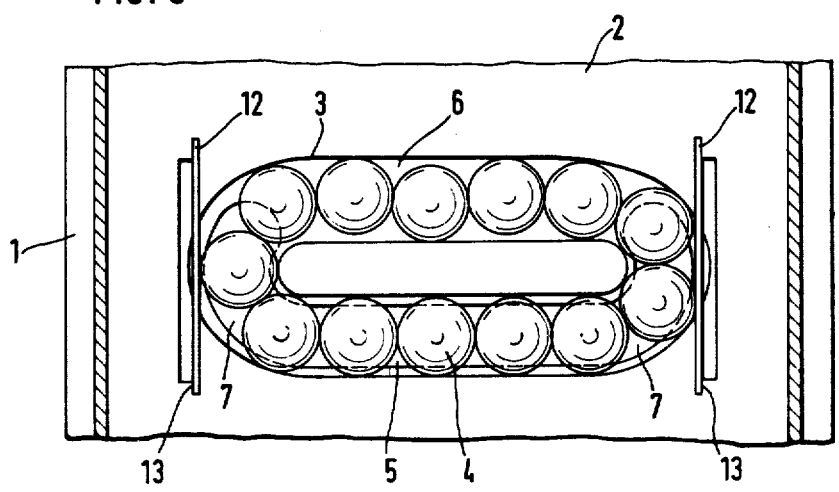

RECIRCULATING BALL BEARING

PRIOR APPLICATION

This application is a continuation of my copending, commonly assigned U.S. patent application Ser. No. 68,639 filed Aug. 22, 1979, now abandoned.

STATE OF THE ART

Ball bearings of this nature are known in a great variety of designs but the requirement of a completely jolt-free running action has not yet been attained. This deficiency leads again and again to operating difficulties and often to premature failure of the ball bearing. The jerky running motion of the bearing is caused by tensions within the individual ball races brought about by the balls becoming offset in the unloaded or unstressed section of the race. Because the balls in this section are not guided by restraints as in the stressed or loaded section of the race, the balls can move laterally due to the necessary clearance in the guide sleeve whereby the specified running clearance between the individual balls shifts so that the balls are hindered in their unrestrained circulation in the unstressed race section and are jammed, particularly when the entire residual clearance migrates into the carrying race section.

It has been suggested to prevent this occurence by inserting springy intermediate elements between the balls in some areas of each ball race but the disadvantage of such a design is the greatly reduced load-bearing capacity of the bearing due to the missing balls and rapid destruction of the springy intermediate elements at the occuring high speed and accelerations which automatically leads to failure of the bearing.

OBJECTS OF THE INVENTION

It is an object of the invention to provide a ball bearing for the longitudinally moveable mounting of a shaft in a simple manner with a long life and jolt-free operation.

This and other objects and advantages of the invention will become obvious from the following detailed description.

THE INVENTION

The novel ball bearing of the invention for longitudinally moveable mounting of shafts is comprised of an outer race sleeve and a concentrically disposed guide sleeve with a plurality of ball races distributed over its circumference, each of the said ball races consisting of two straight race sections extending essentially parallel to the bearing axis and two semi-circular race sections connecting the two straight race sections and a plurality of balls guided in the races under load in only one straight race section and under no load in the remainder of the race sections, the improvement comprising providing at least one elastically yielding area in the said remainder of the race section. The elastically yielding area may be formed by a springy or spring loaded element limiting the race which has the advantage over known designs of preventing offsetting the set of the balls without decreasing the load-bearing capacity of the bearing.

It is possible as a function of the design of such a ball bearing for the elastically yielding element to form an integral part of the race or guide sleeve. Such a design is particuarly advantageous for the assembly of the ball bearing as no additional parts are needed. But it is also possible to produce the elastically yielding element separately and to have the race or guide sleeve elastically support it. The small extra cost caused thereby for the assembly of the ball bearing is compensated for by a simpler forming method when producing the individual parts.

It is provided, in one embodiment example of the invention, that a spring-elastic element which elastically yields radially outwardly is disposed at least in the area of one semi-circular race section between race and guide sleeve. Such an element can be produced at low cost by non-cutting methods and assembled without much difficulty at the same time that the ball bearing is assembled.

According to another embodiment of the invention, at least one semi-circular race section is limited in its axially outer area by an element elastically yielding outwardly radially and/or axially. This arrangement makes it possible to provide either a separately produced element or an element forming an integral part of the race or guide sleeve. In a further modification of the invention, the straight, unstressed race section is limited by at least one tangentially elastic strip and preferably, almost the entire, unstressed straight race section is made to elastically yield.

According to one advantageous variation of the invention, the guide sleeve is made of plastic and the elastically yielding element is designed as an integrally molded-on tongue. This arrangement offers the advantage that the elastically yielding area is enlarged in an advantageous manner, as the tongue is elastically yielding in both radial and axial directions. But it is also possible for the elastically yielding element to be designed as a flat spring inserted in a recess in the guide sleeve. By this measure, an elastic area preventing jamming of the balls is formed in at least one semi-circular race section.

Another embodiment of the invention comprises an elastically yielding element designed as an axially moveable slide, shaped on its side facing the semi-circular race section to conform to the limiting contour of this section and being spring-loaded. Due to its shape, such a slide offers the advantage that almost the entire semi-circular race section is made elastically yielding. In a further embodiment of the invention, there is disposed in the area of the straight, unstressed race section between race and guide sleeve a metal strip which is fastened to the guide sleeve and yields elastically radially outward. Through such a design, too, almost the entire straight, unstressed race section is made elastically yielding.

To prevent destruction of the elastically yielding area by inertial forces active during operation, it is possible to dispose the elastically yielding elements so that they make contact with the race or guide sleeve after traversing a predetermined spring distance, but the design may also be such that the elastically yielding elements are arranged so that the balls make contact with the race and/or guide sleeve after the traversal of the predetermined spring distance.

Finally, another variation the elastic elements are disposed in the presence of several elastic areas in one ball race so that their mutual spacing deviates from a multiple of the spring between two consecutive balls. Such an arrangement has the advantage that at least one of the balls circulating without restraint in the unstressed race section is constantly under spring pressure, without the elastically yielding elements being elastically extended to the same extent at the same time.

Figure 2:
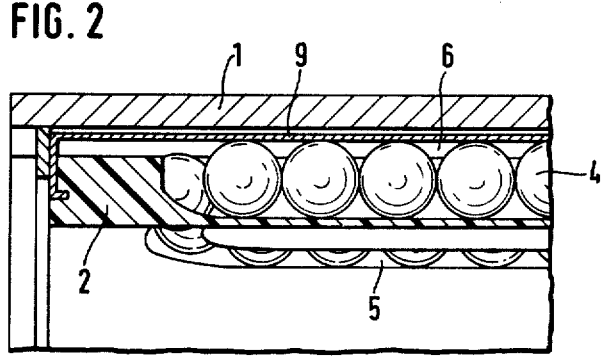
Figure 3:
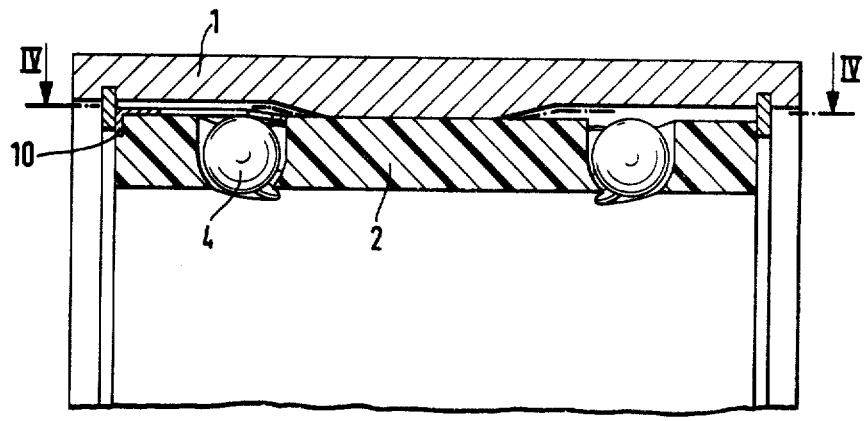
Figure 4:
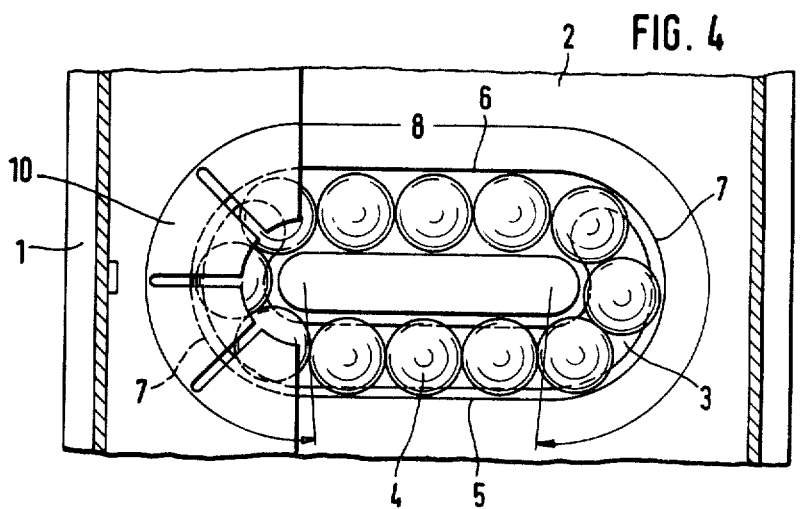
Figure 5:
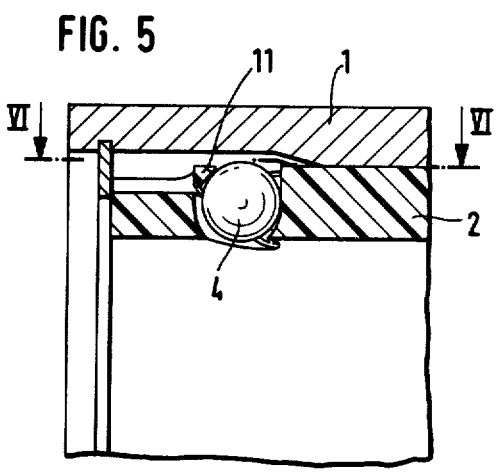
Figure 6:
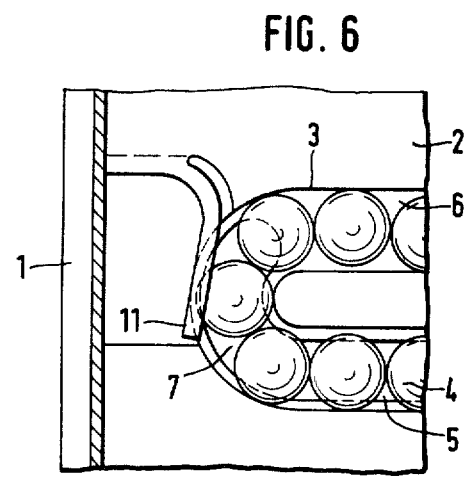
Figure 9:
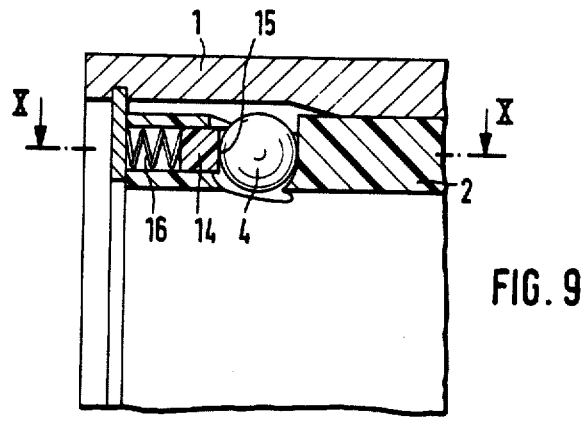
Figure 10:
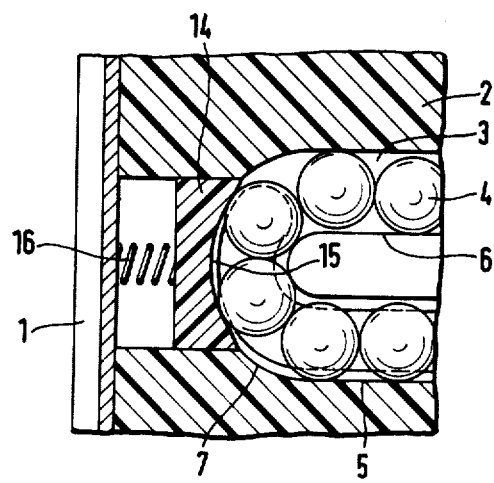
Figure 11:
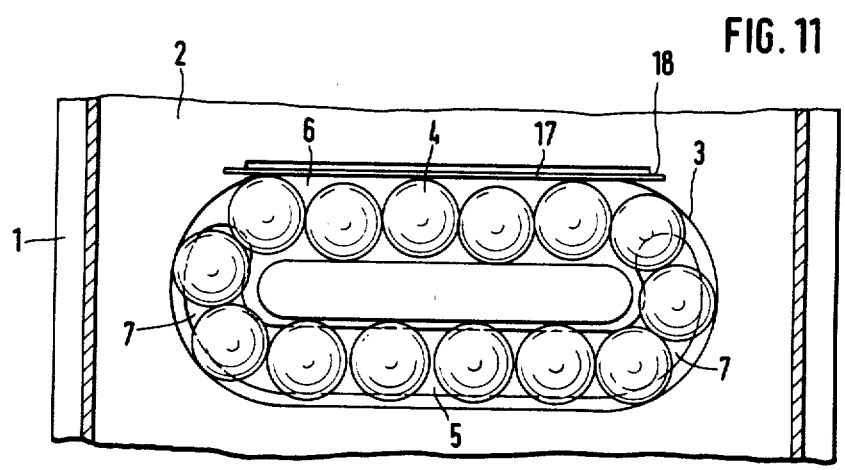

Referring now to the drawings:

FIG. 1 is a tranverse cross section of one embodiment of the invention and,

FIG. 2 is a partial longitudinal cross section taken along line II—II of FIG. 1, FIG. 3 is a longitudinal cross section taken along line A—A of FIG. 1 and FIG. 4 is a cross section taken along line IV—IV of FIG. 3, FIG. 5 is a partial longitudinal cross section taken along line A—A of FIG. 1 and FIG. 6 is a cross section taken along line VI—VI of FIG. 5, FIG. 7 is a longitudinal cross section taken along line A—A of FIG. 1 and FIG. 8 is a cross section taken along line VIII—VIII of FIG. 7, FIG. 9 is a partial cross section taken along line A—A of FIG. 1 and FIG. 10 is a cross section taken along line X—X of FIG. 9 while FIG. 11 is a longitudinal cross section taken along line A—A of FIG. 1.

In a manner known per se, the ball bearing illustrated in FIGS. 1 to 11 consists of outer race sleeve 1, guide sleeve 2 which is concentrically disposed in the former and has several ball races 3 distributed over its circumference in which a number of balls 4 are guided. The ball races 3 are formed by two straight race sections 5 and 6 and by two semicircular race sections 7 which interconnect the former and the balls 4 are under load only in the straight race section 5, whereas they are under no load in the remaining, roughly C-shaped race section 8 (See FIG. 4) consisting of straight race section 6 and semi-cicircular race sections 7. Disposed in the area of the straight, unstressed race section 6 between the race sleeve 1 and the guide sleeve 2 in FIGS. 1 and 2 is an elastic strip 9 which is fastened to the guide sleeve 2 and yields elastically radially outward.

FIGS. 3 and 4 illustrate a spring-elastic element 10 which yields elastically radially outward disposed in the area of one semi-circular race section 7 between the race sleeve 1 and the guide sleeve 2. In the embodiment example of FIGS. 5 and 6, the guide sleeve 2 is made of plastic and the elastically yielding element is designed as tongue 11 integrally molded-on to the guide sleeve 2 and elastically yielding radially and axially.

In the embodiment shown of FIGS. 7 and 8 elastically yielding areas are provided in both semi-circular race sections 7 and the elastically yielding elements are designed as flat springs 12 inserted into recesses 13 of guide sleeve 2. As may be seen particularly in FIG. 8, the flat springs 12 are disposed so that their mutual spacing deviates from a multiple of the spacing between two consecutive balls. In FIGS. 9 and 10, the elastically yielding element consists of an axially moveable slide 14 which is shaped on its side facing the semi-circular race section 7 to conform with the limiting contour of this section and which is loaded by spring 16. In the embodiment of FIG. 11, the straight, unstressed race section 6 is limited by tangentially elastic strip 17 inserted into recess 18 of the guide sleeve 2.

To prevent overloading the elastically yielding components, the design of the embodiment of FIGS. 1,2,3 and 4 is such that metal strip 9 or element 10 makes contact with race sleeve 1 after the traversal of a predetermined spring distance. In the embodiments of FIGS. 7,8 and 11, guide sleeve 2 forms the stop for flat spring 12 or strip 17, respectively. Finally, in the embodiments of FIGS. 5,6,9 and 10, balls 4 make contact with the race and/or guide sleeve 1 and 2, respectively, when tongue 11 or slide 14 has traversed the predetermined spring distance. The elastically yielding elements illustrated in the drawings may be further modified in adaption to the design of the bearing as well as with respect to the production of the components themselves. For instance, it is possible to interconnect the strips shown in FIGS. 1 and 2 at least at one end so that a round, ring-shaped collar is provided instead of a web pointing radially inward. By the same token, the spring-elastic element shown in FIGS. 3 and 4 may be designed either as a single-part sleeve covering all the ball races or as an annular section assigned to each ball race.

Various other modifications of the bearings of the invention may be made without departing from the spirit or scope thereof and it is to be understood that the invention is to be limited only as defined in the appended claims.

I claim:

1. A ball bearing for longitudinally moveably mounting of a shaft comprising an outer race sleeve and a concentrically disposed guide sleeve with a plurality of ball races distributed over its circumference, each of the said ball races consisting of two straight race sections extending essentially parallel to the bearing axis and two semi-circular race sections connecting the two straight race sections and a plurality of balls guided in the races under load in only one straight race section and under no load in the remainder of the race section, the improvement comprising providing at least one elastically yielding spring element pressing on the unloaded balls in the remainder of the race section.

2. A bearing of claim 1 wherein the element is an integral part of the race or guide sleeve.

3. A bearing of claim 2 wherein the element is separate and is elastically secured to the race or guide sleeve.

4. A bearing of claim 3 wherein an elastic strip fastened to the guide sleeve and elastically yielding radially outward, is disposed in the area of the straight, unstressed race section between the race and guide sleeve.

5. A bearing of claim 3 wherein a spring-elastic element elastically yielding radially outward is disposed at least in the area of one semi-circular race section between the race and the guide sleeve.

6. A bearing of claim 2 wherein at least one semi-circular race section is limited in its axially outer area by an element which yields elastically outward radially and/or axially.

7. A bearing of claim 6 wherein the elastically yielding element is a flat spring inserted into a recess of the guide sleeve.

8. A bearing of claim 6 wherein the elastically yielding component is an axially moveable slide shaped on its side facing the semi-circular race section in conformity with the limiting contour of this section and loaded by a spring.

9. A bearing of claim 2 wherein the straight, unstressed race section is limited by at least one tangentially elastic strip inserted in a recess of the guide sleeve.

10. A bearing of claim 2 wherein the guide sleeve is made of plastic and the elastically yielding element is an integral, molded-on tongue.

11. A bearing of claim 1 wherein the elastically yielding spring element is disposed to make contact with the race or guide sleeve after traversal of a certain spring distance.

12. A bearing of claim 1 wherein the elastically yielding spring element is disposed so that the balls make contact with the race and/or guide sleeve after the traversal of the predetermined spring distance.

13. A bearing of claim 1 wherein in the presence of several elastic areas in one ball race the elastic spring elements are disposed so that their mutual spring deviates from a multiple of the spacing between two consecutive balls.

* * * * *